April 9, 1929.   J. T. FAGAN ET AL   1,708,788
APPARATUS FOR COLORING GLASS INCLOSURES
Filed Dec. 6, 1927   2 Sheets-Sheet 1
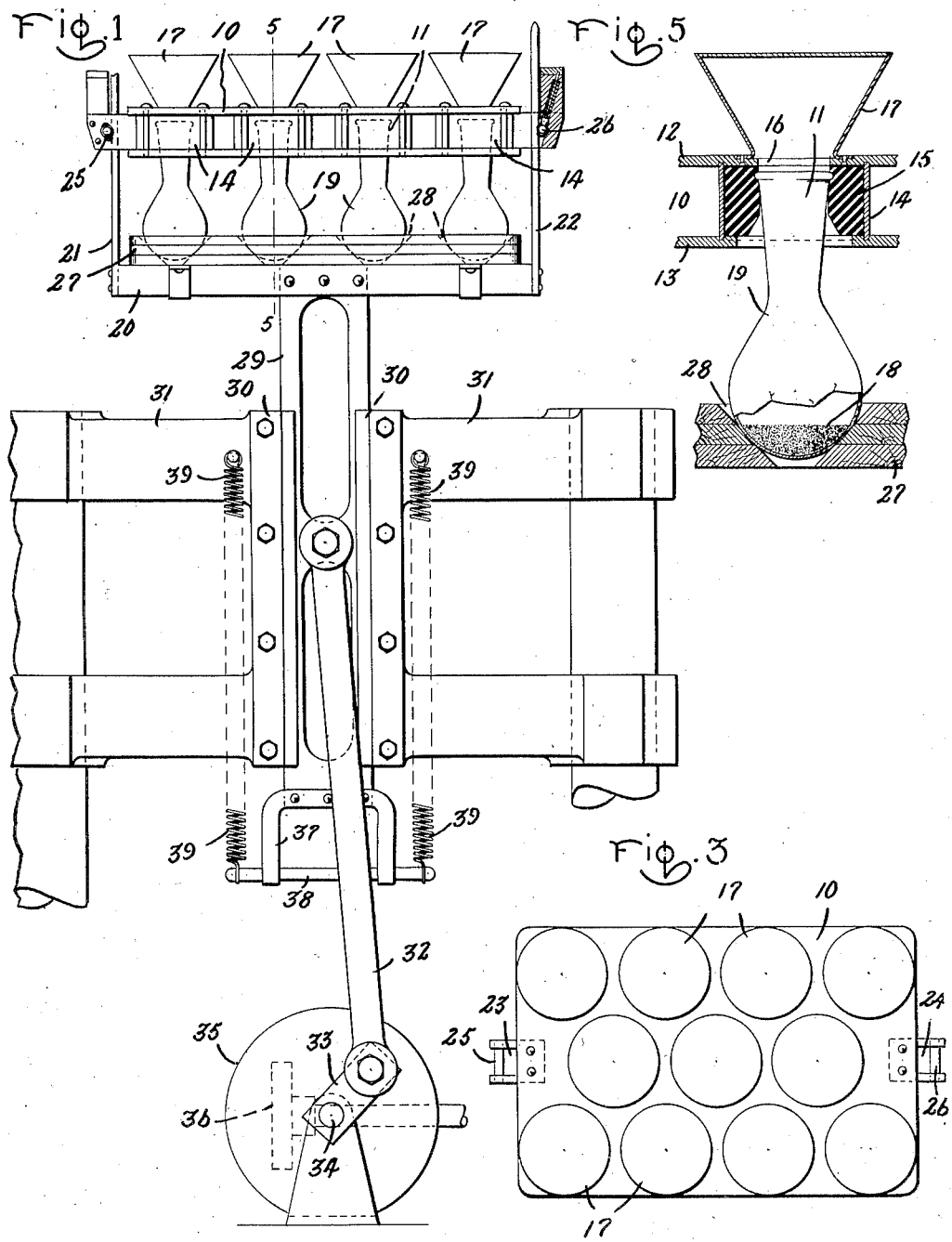
INVENTOR:
JOHN T. FAGAN,
ROSCOE G. PHELPS,
BY
THEIR ATTORNEY.

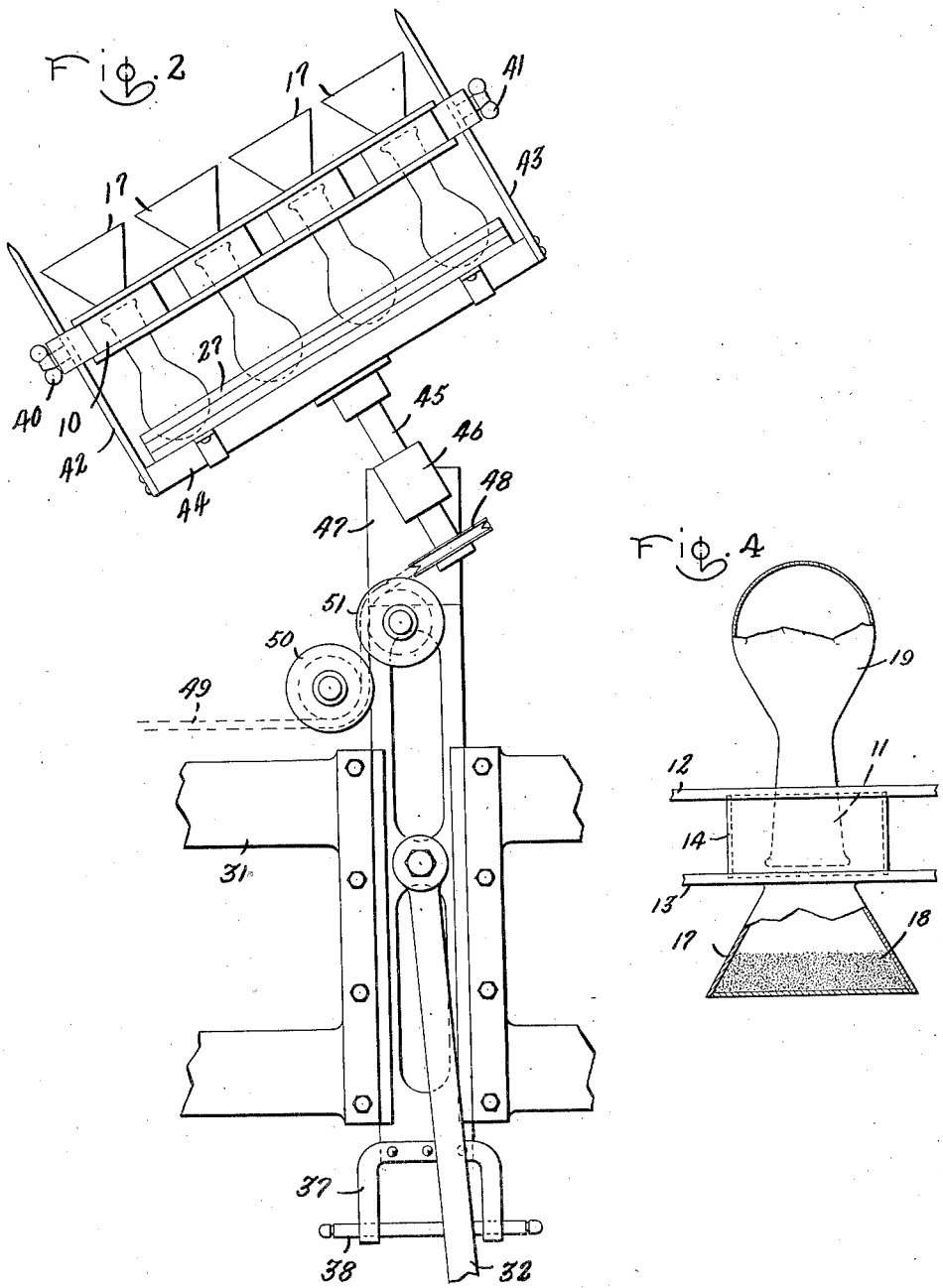

Patented Apr. 9, 1929.

1,708,788

UNITED STATES PATENT OFFICE.

JOHN T. FAGAN, OF CLEVELAND HEIGHTS, AND ROSCOE G. PHELPS, OF CLEVELAND, OHIO, ASSIGNORS TO GENERAL ELECTRIC COMPANY, A CORPORATION OF NEW YORK.

APPARATUS FOR COLORING GLASS INCLOSURES.

Application filed December 6, 1927. Serial No. 238,182.

Our invention relates to apparatus for coloring bulbs and other glass inclosures on the inside by means of dry powdered pigments. Our invention is particularly adapted for use in the application of the method disclosed in Pipkin application Serial No. 231,541, filed November 7, 1927. The object of our invention is to provide an efficient conveniently operated apparatus which will produce a uniform attractive coating on the bulb or other article. Further features and advantages will appear from the following description of species thereof and from the accompanying drawings.

In the drawings Fig. 1 is a partial elevation of an apparatus embodying our invention; Fig. 2 is a similar view of another form of apparatus embodying our invention; Fig. 3 is a top plan view of a bulb holder used in connection with our apparatus; Fig. 4 is a fragmentary vertical section on an enlarged scale showing the bulb and its holder in the inverted position prior to being placed upon the apparatus; and Fig. 5 is a similar view showing the position of the bulb after being placed upon the apparatus ready for treatment.

As shown in the drawings, our apparatus comprises the removable holder 10 which comprises a number of sockets for receiving the necks of bulbs 11. The said holder comprises two plates 12—13 clamped between which are a plurality of cup members or sockets consisting of cylindrical shells 14 containing the centrally apertured bushings or rings 15 of resilient material such as soft rubber. Sponge rubber is suitable for this purpose although other materials may be used which will have the desired resiliency to hold the bulb or other article when it is inserted therein. Also mounted on the plate 12 and registering with the apertures 16 of the bushings or rings 15 are a plurality of cups 17 preferably of metal. As shown in Fig. 4 the holder is initially in such a position that the cups 17 are in the lowermost position and each contains a quantity of powdered pigment 18. The bulbs 19 which, as disclosed in the Pipkin application hereinbefore referred to are frosted on the inside, are inserted in the sockets 14. The holder is then inverted causing the powdered pigment 18 to fall from the cups 17 into the bulbs 19 such as shown in Fig. 5. The holder is then placed in a machine, as shown in Fig. 1, which comprises a plate 20 which has extending upwardly therefrom a pair of rods 21—22. These rods extend through slots 23—24 formed in the holder which in turn is rigidly held on the said rods through a pair of spring pressed pins 25—26. In order to position and rigidly hold the bulbs during the coloring operation a base 27 is provided. This base is carried by the plate 20 and has located therein a series of depressions 28 shaped to receive and support the bowl portions of the bulbs 19.

The plate 20 is supported on the upper end of a bar 29 which slides in grooves formed by the vertical strips 30 and stationary frame 31. A vibrating motion is communicated to the plate 20 through the connecting rod 32 pivoted at one end to the bar 29 and to the other end to a lug 33 mounted on shaft 34 which is rotated through the friction discs 35—36. The lower end of bar 29 carries a bracket 37 comprising cross rod 38 to the ends of which are connected the springs 39 having their other ends attached to the stationary frame 31. After a holder loaded with bulbs has been placed on the machine and properly secured to the rods 21—22, the machine is started causing a rapid vibration which distributes the powdered pigment over the interior frosted surface of the bulb. When this operation has lasted long enough to produce the desired uniform coating the machine is stopped, the holder removed and inverted as shown in Fig. 4, causing the excess pigment to fall from the bulbs back into the cups 17. The bulbs can then be removed and new bulbs inserted and the operation of the machine repeated.

In Fig. 2 is shown another form of machine in which the holder 10 rests in an inclined position, being held in this position through a pair of clamp screws 40—41 which bear against the rods 42—43 extending upwardly from the plate 44. In addition to being rapidly vibrated the holder is slowly rotated during the vibrating operation. We find that in coloring glass articles having long narrow necks the color is more evenly distributed where this method is employed. The plate 44 has depending therefrom a short shaft 45 which is supported in the bracket 46 carried on the upper end of the sliding bar 47. A pulley 48 fastened to the lower end of the shaft 45 is rotated from an outside source (not shown) through the belt 49 which rides over the idlers 50—51.

What we claim as new and desire to secure by Letters Patent of the United States, is:

1. In a machine of the class described, the combination of a holder comprising an apertured socket for receiving the neck of a bulb or similar article, a cup having an aperture in registry with the aperture in said socket, a support adapted to receive said holder, and means for vibrating said support.

2. In a machine of the class described, the combination of a holder comprising an apertured socket for receiving the neck of a bulb or similar article, a cup having an aperture in registry with the aperture in said socket, a support adapted to receive said holder, and means for simultaneously vibrating and rotating said support.

3. In a machine of the class described, the combination of a holder having a socket comprising a resilient apertured bushing for receiving the neck of a bulb or similar article, a cup having an aperture in registry with the aperture in said socket, a support adapted to receive said holder, and means for vibrating said support.

4. In a machine of the class described, the combination of a holder having a socket comprising a resilient apertured bushing for receiving the neck of a bulb or similar article, a cup having an aperture in registry with the aperture in said socket, a support adapted to receive said holder, and means for simultaneously vibrating and rotating said support.

In witness whereof, we have hereunto set our hands this 2nd day of December, 1927.

JOHN T. FAGAN.
ROSCOE G. PHELPS.